R. BAER AND H. KOPP.

LOCKING DEVICE FOR MOTOR VEHICLES.

APPLICATION FILED MAR. 24, 1922.

Reissued May 16, 1922.

15,353.

2 SHEETS—SHEET 1.

INVENTORS
Richard Baer
Hugo Kopp.
BY C. P. Goepel
ATTORNEY

R. BAER AND H. KOPP.

LOCKING DEVICE FOR MOTOR VEHICLES.

APPLICATION FILED MAR. 24, 1922.

Reissued May 16, 1922.

15,353.

2 SHEETS—SHEET 2.

INVENTORS
Richard Baer
& Hugo Kopp
BY
C. P. Goepel
ATTORNEY

UNITED STATES PATENT OFFICE.

RICHARD BAER AND HUGO KOPP, OF NEW YORK, N. Y.

LOCKING DEVICE FOR MOTOR VEHICLES.

15,353. Specification of Reissued Letters Patent. Reissued May 16, 1922.

Original No. 1,391,358, dated September 20, 1921, Serial No. 393,348, filed July 1, 1920. Application for reissue filed March 24, 1922. Serial No. 546,499.

*To all whom it may concern:*

Be it known that we, RICHARD BAER, a citizen of Czecho-Slovakia, and resident of the borough of Manhattan, in the city, county, and State of New York, and HUGO KOPP, a citizen of Germany, and resident of the city, county, and State of New York, have invented certain new and useful Improvements in Locking Devices for Motor Vehicles, of which the following is a description.

This invention relates to an improved locking device for motor vehicles, and generically considered comprehends a simple and effective means whereby the power transmission gearing of a motor-driven vehicle may be positively locked so as to render the mechanical operation of the vehicle impossible.

In the preferred embodiment of our invention we propose to provide a means for locking the transmission gearing, which is of such construction that when the vehicle is in the garage, the connections between the operating motor and vehicle wheels may be rendered inoperative, while at the same time the wheels are permitted to rotate so that the vehicle can be moved freely from place to place in the garage.

It is also an object of our invention to provide a locking device for the drive gearing of a motor vehicle in which a permutation lock of the type disclosed in our pending application, No. 382,645, may be advantageously employed so as to preclude all possibility of the lock being actuated, and the gearing released for operation by unauthorized persons.

In accomplishing the above purpose in one embodiment of the invention we provide a pair of movable locking bars having means to coact with power transmission gears on the clutch shaft and the main shaft of the transmission mechanism, the latter gear being axially shiftable to connect it to the gear on the clutch shaft so that said shafts will be rotated as a unit, the bar engaging the shiftable gear also having means to prevent the shifting movement thereof, which will be effective both when the gear is free to rotate, and when it is locked against such rotation, and a combination locking means having a part to coact with said bars and hold the same in operative relation to the transmission gears.

It is also a further object of the invention to devise a locking device for motor vehicles which will effectually prevent theft of a vehicle by positively locking the wheels against rotation, said device being so located and arranged that it can be readily applied to the ordinary motor vehicle without necessitating material alterations therein, and at comparatively small expense.

With the above and other objects in view, the invention consists in the improved construction, form and relative arrangement of the several parts, which will be hereinafter more fully described, illustrated in the accompanying drawings, and subsequently incorporated in the subjoined claims.

In the drawings, wherein we have illustrated one satisfactory and practical embodiment of the invention, and in which similar reference characters designate corresponding parts throughout the several views.

Figure 1:
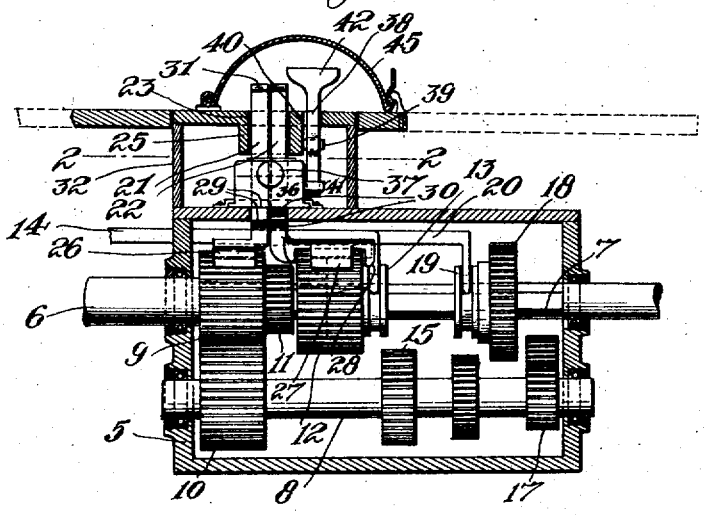
Figure 1 is a vertical sectional view through the box or housing for the change speed gearing of a motor vehicle, showing our improved locking device applied thereto.
Figure 2:
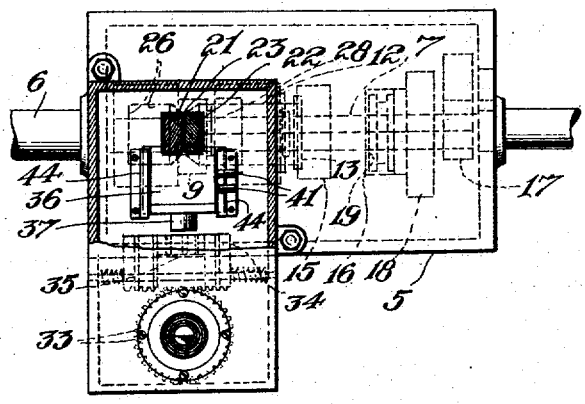
Fig. 2 is a horizontal sectional view through the casing or housing of the permutation lock mechanism, showing the gear engaging bars locked against movement.
Figure 3:
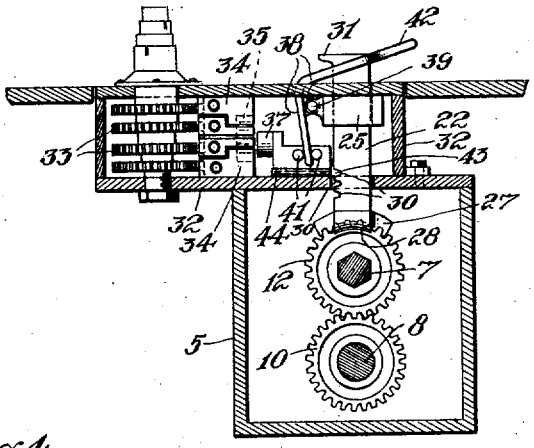
Fig. 3 is a vertical sectional view taken transversely through the casing in front of the gear 12.

Referring more particularly to the drawings, we have therein illustrated a conventional and well known type of change speed transmission gearing for automobiles. This gearing is housed within a box or casing 5, in one end of which the drive shaft 6 from the clutch is journaled. The main shaft 7 is journaled in the opposite end of the gear box, and is disposed in axial alignment with the shaft 6, the end of the shaft 7 having a suitable bearing in the opposed end of the shaft 6. 8 designates the counter-shaft, which extends through the box 5 below, and in parallel relation with the shafts 6 and 7.

Upon the drive shaft 6 and the counter-shaft 8 the constantly meshing gears 9 and 10 respectively are fixed. The gear 9 is provided upon one face with laterally projecting clutch teeth 11, which are adapted to engage with complementary internal clutch teeth on the high and intermediate speed gear 12, which is mounted on the shaft 7. The main shaft 7 is of the usual polygonal cross sectional form, and the gear 12 is axially shiftable upon said shaft, said gear being provided at one end with a peripherally grooved collar 13 to receive the yoke arms on the end of a shift rod 14. Upon the counter-shaft 8 the intermediate, low, and reverse gears, designated 15, 16 and 17 respectively, are fixed, and the axially shiftable low and reverse gear 18 is mounted on the main shaft 7, said gear likewise having the peripherally grooved collar 19 to receive the yoke arms on the end of a second shift rod 20. As this gearing is actuated in the usual manner, to drive the machine at various speeds, no further detail description thereof will be required.

The subject-matter of the present application in the embodiment thereof illustrated in the drawings, includes the bars 21 and 22 respectively, which are mounted for vertical movement through an opening 23 in the top wall of the gear box 5, said bars extending upwardly through a guide boss 25 formed on the under side of the floor plate 24. The lower ends of the bars 21 and 22 within the gear box are laterally offset in relatively opposite directions, said end of the bar 21 being provided with an arcuately curved locking rack 26 which is concentrically related to the gear 9 on the drive shaft 6, and is provided on its lower face with spaced teeth for interlocking engagement with the teeth on said gear. The other of the bars 22 is likewise provided upon its laterally offset end portion with a similar arcuately curved locking rack 27 to coact with the teeth of the high and intermediate speed gear 12 on the main shaft 7. This bar 22, however, in addition to the rack 27, is provided with the lugs or shoulders 28 spaced from the opposite side edges of the rack 27, and which are adapted to overlie the opposite side faces of the gear 12.

The bar 21 is provided with two spaced notches or recesses 29 in one edge thereof, while the bar 22 has three such spaced notches or recesses 30, and the distance between the notches 29 of the bar 21 is the same as the distance between the end notches 30 of the bar 22. Each of the bars is further provided at its upper end with a laterally projecting finger piece 31 for convenience in the manipulation of said bars.

In conjunction with the bars 21 and 22 designed to coact with the respective power transmission gear elements 9 and 12, to lock the same against rotation, we employ a permutation locking mechanism. For any simply constructed, easily operated and reliable locking mechanism of this type which may be advantageously utilized for the present purpose, reference may be had to Figs. 10 and 11 of the drawings in our pending application for patent on permutation locks, Serial No. 382,645, filed May 19, 1920. It is, however, to be clearly understood that this particular locking mechanism is but one of many different constructions which might be employed in combination with the gear locking means above described, and we do not, therefore, consider ourselves at all limited in this respect, but merely refer to the permutation lock of our pending application as one which we believe to be very well adapted to such use.

As herein shown, the casing or housing 32 for the permutation locking mechanism is arranged and secured between the top wall of the gear box 5 and the floor plate 24. Since the specific construction of such locking mechanism constitutes no essential part of the present invention, it will suffice to describe such mechanism only in a general way. It may, therefore, be stated that this mechanism includes a series of independently operable rotatable locking disks 33, which respectively coact with relatively slidable members 34, said members being yieldingly held in a normal position by suitable springs to thereby associate recessed portions of said members, and form a cylindrical socket 35. A block 36 is also mounted in the housing 32, and is rectilinearly movable in a plane at right angles to the plane of movement of the slide members 34. This block 36 is provided upon one end with a cylindrical stud 37, adapted to enter the cylindrical socket 35.

Upon one side of the guide boss 25 a lever 38 is pivotally mounted, as at 39, and extends through a slot 40 in the floor plate 24. The lower end of this lever is engaged between spaced studs 41 projecting from one side of the slide block 36. The upper portion of the lever is angularly extended over the floor plate, and provided with a terminal finger piece 42. One end of the slide block 36 is formed with a single tooth 43, which is adapted for engagement in aligned recesses or notches 29 and 30 of the bars 21 and 22. It will be understood that suitable guide means is provided for the slide block 36, such, for instance, as the angle bars 44 engaging longitudinal flanges on the opposite side of said block.

Preferably a movable cover 45 of sheet material extends over the ends of the bars 21 and 22 and lever 38, which project above the floor plate 24. Suitable fastening means is provided for one side of said cover, so that it may be fixed in place for ready release, and swung to one side, so as to afford access to the lever 38 and the locking bars. It will be understood, of course, that the actuating sleeves or barrels of the permutation lock, having graduations thereon, project above the floor surface, so that they may be easily operated by one possessing a key to the combination in order to release the locking mechanism.

In the practical operation of the device, as above described, in order to lock the power transmission gearing against effective operation, the two bars 21 and 22 are permitted to drop through the opening 23 in the top of the gear box, so that the tooth racks 26 and 27 on the lower end of these bars will respectively engage the gears 6 and 12, and interlock therewith to thereby prevent any rotation of said gears and the shafts 6 and 7 on which they are mounted. Also, it will be observed that the lugs or shoulders 28 of the bar 22 extend downwardly over the opposite side faces of the gear 12, and thus prevent any axial shifting movement of this gear, so that it cannot be operatively clutched to the gear 9 on the drive shaft. In this position of the bars 21 and 22, the upper notches or recesses 29 and 30 of said bars are in horizontal alinement, and are disposed above the top wall of the gear box. The lever 38 is now actuated to shift the block 36 and engage the tooth 43 thereof in these upper notches of the bars 21 and 22, the stud 37 on the opposite end of said block moving out of the cylindrical recess or socket 35 formed by the slide members 34. The disks 33, which are operatively engaged with said slide members, are now actuated to shift the slide members relative to each other, and disassociate the recessed portions thereof, so as to destroy the formation of the recess or socket 35, thus preventing any possibility of a reverse shifting movement of the block 36 and the disengagement of its tooth 43 from the notches 29 in the gear locking bars. Thus it will be apparent that one who does not possess the combination of the permutation locking means cannot release the power transmission gearing for effective operation. While the engine might be operated, the drive shaft 6 cannot rotate owing to the locking engagement of the rack 26 with the gear 9 and it is apparent that the driving impulse cannot be transmitted through said shaft to the rear axle of the vehicle. Further, as the rack 27 is locked with the gear 12 on the main shaft 7, which is geared to the rear axle through the differential gearing, it will also be seen that the vehicle cannot be hauled or pulled, since the drive wheels are themselves locked securely against rotation.

Figure 4:
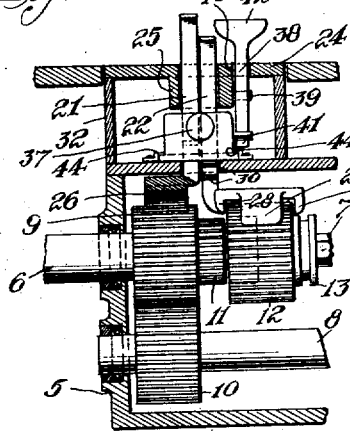
Fig. 4 is a detail section similar to Fig. 1, showing one of the movable bars out of locking engagement with the gear element on the drive shaft to permit of the operation of the motor.
Figure 5:
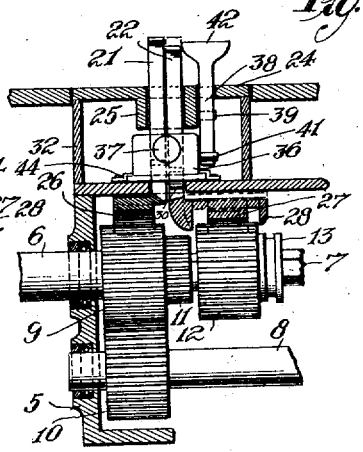
Fig. 5 is a similar detail section showing both of the bars locked out of operative engagement with the gearing.

In certain cases, however, it may be desirable to operate the drive shaft 6 from the engine and still lock the drive wheels of the machine against rotation. In such case the bars 21 and 22 are arranged as shown in Fig. 4, the bar 21 being raised so as to disengage its rack from the gear 9 and aline the lower notch or recess 29 in said bar with the upper notch or recess 30 in the bar 22. The block 36 is then shifted by means of the lever 38 to engage the tooth 43 in these alined recesses. Again, when the machine is in the garage, it may be desirable to permit movement of the machine manually from place to place and yet lock the power means against operation, so that the machine cannot be driven by the attendants or employees in the garage. In this case the bar 21 remains in its locked position upon the gear 9, as shown in Fig. 1, while the bar 22 is lifted to disengage the rack 27 from the teeth of the gear 12, thus permitting the rotation of the gear. However, the shoulders 28 will still be engaged over the opposite side faces of the gear 12, and will prevent accidental shifting movement thereof, so that the clutch teeth of said gear cannot engage the clutch teeth 11 on the gear 9, which would result in serious damage or injury to the mechanism.

In this position of the bars 21 and 22 the intermediate notch 30 in the bar 22 is alined with the upper notch 29 in the bar 21 for the purpose of receiving the locking tooth 43 on the slide block 36, whereby the bar 22 will be locked in this intermediate position, while the bar 21 is locked in effective engagement with the gear 9.

In this manner it will be seen that both the driving gear and the high speed gear may be securely locked against rotation, or either of said gears locked independently of the other, and in addition the high speed gear can be released for rotating movement, though held against an axial shifting movement, while the driving gear is either locked or released, so that the motor may be operated.

From the foregoing description considered in connection with the accompanying drawings, the construction, manner of operation, and several advantages of our invention will be clearly and fully understood. It will be appreciated that the locking device as herein disclosed, may be easily applied to the power transmission gearing of various types, such as is provided for the propulsion of motor vehicles, and that the mechanism will be securely and effectively locked against operation to propel the machine. The key to the combination of the permutation locking mechanism, being possessed only by the owner of the machine, possibility of theft is practically precluded. The embodiment of the invention as herein shown and described we believe to be entirely practical, as well as reliable and efficient in actual operation. Nevertheless it is to be understood that in the commercial development of the invention it may be desirable to resort to numerous variations in the form, construction and relative arrangement of the several parts, and it is, therefore, to be understood that the invention may be exemplified in numerous alternative constructions as may be fairly embodied within the spirit and scope of the appended claims.

We claim:

1. In combination with change speed mechanism, including rotatable power transmission elements, one of said elements being axially shiftable for connection and disconnection with respect to the other element; means for locking said elements against rotation when in disconnected relation.

2. In combination with change speed mechanism, including rotatable power transmission elements, one of said elements being axially shiftable for connection and disconnection with respect to the other element; means for locking said elements against rotation when in disconnected relation, and also preventing axial movement of the shiftable element.

3. In combination with change speed mechanism, including rotatable power transmission elements, one of said elements being axially shiftable for connection and disconnection with respect to the other element; means for locking said elements against rotation when in disconnected relation, said means including a part operable to also lock the shiftable element against axial movement, and further to permit of the rotation of said element while preventing axial movement thereof.

4. In combination with the transmission mechanism of a motor vehicle including a drive gear and a rotatable and axially shiftable high and low speed gear, of a locking mechanism for the transmission comprising companion members adapted to be individually movable and adjustable into and out of engagement independently with said drive gear and high and low speed gear respectively, said member engaging the high and low speed gear provided with means for both preventing the axial shifting of the gear and its rotation, said member adapted to be adjusted to permit the rotation of the gear but to prevent its axial shifting, and a locking mechanism adapted to cooperate simultaneously with said companion members for holding the same in various relative positions of adjustment.

5. In combination with a transmission for self-propelled vehicles having a drive gear and an axially shifting and rotatable high and low speed gear, of companion members associated together and mounted for relative reciprocating movement, one of said members provided with a tooth adapted to engage the teeth of said drive gear to prevent its rotation, said other member provided with a tooth for engaging the high and low speed gear and also with means to engage the sides of the last mentioned gear to avoid its axial sliding movement, said last mentioned member adapted to be moved away from the high and low speed gear sufficiently to withdraw its tooth from the teeth of the gear but not sufficiently to permit the sliding of the gear due to said means, and a common locking mechanism for said companion members adapted to hold the same in various relative positions of adjustment.

6. In combination with a drive gear and a high and low speed gear having axial shifting and rotatable movement, said gears being parts of an automobile transmission, of a pair of relatively shiftable bars having teeth to lock in the teeth of the respective gear wheels, one of said bars being provided with means to extend over opposite sides of the high and low speed gear, said latter part adapted to be shifted in one direction to disengage its tooth from said high and low speed gear while said means prevents the axial movement of said gear, and a common locking mechanism for said bars adapted to engage the same in their different shifted positions to retain the same in their adjusted positions.

7. In combination with change speed gearing for motor vehicles, including a gear fixed on the clutch shaft, and an axially shiftable gear on the main shaft; means to coact with each of said gears and hold the same against rotation, and means for locking said last-named means in such coacting relation with the gears.

8. In combination with change speed gearing for motor vehicles, including a gear fixed on the clutch shaft, and an axially shiftable gear on the main shaft; means to coact with each of said gears and hold the same against rotation, means for locking said last-named means in such coacting relation with the gears, and including a part adjustable to prevent axial movement of the shiftable gear while permitting rotation thereof.

9. In combination with change speed gearing for motor vehicles, including a gear fixed on the clutch shaft, and an axially shiftable gear on the main shaft; adjustable members having means to directly engage the respective gears and hold the same against rotation, one of said members also having means to prevent axial movement of the shiftable gear, and a combination lock having a part to coact with said members and lock the same in their effective positions.

10. In combination with change speed gearing for motor vehicles, including a gear fixed on the clutch shaft, and an axially shiftable gear on the main shaft; independently adjustable members having means to directly engage the respective gears and hold the same against rotation, one of said members also having spaced shoulders to extend over opposite sides of the shiftable gear and hold the same against axial movement, said latter member being adjustable to release said gear for rotation while preventing its axial movement, and a combination locking mechanism including a part common to both of said members, and coacting therewith to retain the members in their adjusted positions.

11. In combination with change speed gearing for motor vehicles, including a gear fixed on the clutch shaft, and an axially shiftable clutch gear on the main shaft, independently adjustable bars having means on one end to directly engage the respective gears and hold the same against rotation, one of said bars also having spaced shoulders to extend over opposite sides of the shiftable gear, and hold the same against axial movement, each of said bars having a plurality of spaced notches in one edge, and the bar engaging the shiftable gear adapted to be adjusted to an intermediate position to release the gear for rotation while preventing its axial movement, and a common locking means to engage in alined notches in said bars and lock the same in their adjusted positions.

12. In combination with change speed mechanism including a driven element and a driving element, said driving element adapted to be clutched to the driven element by an axial shifting movement; adjustable means adapted to coact with the driving element to prevent rotation thereof, a second adjustable means to coact with the driven element and prevent its axial movement into operative relation with the driving element, and a common means to lock both of said first-named means against actuation.

13. In combination with change speed gearing for motor vehicles including a driving gear and a driven gear adapted to be axially shifted and clutched to said driving gear, independently adjustable members to respectively coact with the driving and driven gears and prevent rotation of the driving gear and hold the driven gear against an axial movement and in disconnected relation to the driving gear, and a common means for locking said members in their adjusted positions.

14. In combination with the change speed gearing of a power transmission mechanism including a driving gear and a driven gear adapted to be axially shifted and clutched to the driving gear; independently adjustable members radially shiftable with relation to the respective gears, one of said members having means to coact with the driving gear and prevent rotation thereof and the other of said members having parts adapted to extend upon opposite sides of the driven gear and hold the same against axial shifting movement with respect to the driving gear, and a common means to lock said members in their adjusted positions.

In testimony that we claim the foregoing as our invention, we have signed our names hereunder.

RICHARD BAER.
HUGO KOPP.